US011940155B1

(12) United States Patent
Nagane et al.

(10) Patent No.: US 11,940,155 B1
(45) Date of Patent: Mar. 26, 2024

(54) MULTI-PIECE ADJUSTABLE END CAP FOR AN APPLIANCE HANDLE ASSEMBLY

(71) Applicant: Haier US Appliance Solutions, Inc., Wilmington, DE (US)

(72) Inventors: Sachin Nagane, Louisville, KY (US); Abhilash Kanthappa Gowda, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/901,996

(22) Filed: Sep. 2, 2022

(51) Int. Cl.
*F24C 15/02* (2006.01)
*E05B 1/00* (2006.01)
*F25D 23/02* (2006.01)

(52) U.S. Cl.
CPC .......... *F24C 15/024* (2013.01); *E05B 1/0015* (2013.01); *F25D 23/028* (2013.01)

(58) Field of Classification Search
CPC ......... E05B 1/0015; E05B 3/04; A47B 95/02; F24C 15/024; F25D 23/02; F25D 23/028
USPC .......................................... 16/436, 412, 413
See application file for complete search history.

(56) References Cited

U.S. PATENT DOCUMENTS 3,017,657 A * 1/1962 Mills .................... F24C 15/024 16/443
3,152,818 A * 10/1964 Ivins ...................... F16B 5/128 411/374
3,426,385 A * 2/1969 Gutshall ................ A47B 95/02 16/412
5,797,164 A * 8/1998 Donaghy ............... A47B 95/02 403/381
5,860,538 A * 1/1999 Duero .................... A47K 10/08 D6/524
7,263,744 B2 9/2007 Kim et al.
7,992,257 B2 * 8/2011 Kim ...................... E05B 1/0015 16/412
8,813,995 B2 8/2014 Kim et al.
9,297,572 B2 3/2016 Bischoff et al.
10,161,669 B2 * 12/2018 Naik ....................... F25D 23/02
2005/0066479 A1 * 3/2005 Kim ...................... F25D 23/028 16/436
2011/0215694 A1 * 9/2011 Fink ...................... E05B 1/0015 312/405
2018/0340348 A1 * 11/2018 Simon ................. E05B 63/0056
2019/0277055 A1 * 9/2019 Rogel ................... E06B 3/4636
(Continued)

FOREIGN PATENT DOCUMENTS

CN 101338630 A 1/2009
CN 102383648 A 3/2012
(Continued)

*Primary Examiner* — Hiwot E Tefera
(74) *Attorney, Agent, or Firm* — Dority & Manning, P.A.

(57) ABSTRACT

A handle assembly for a domestic appliance includes a handle bar, the handle bar defining an axial direction, a radial direction, and a circumferential direction; an inner end cap piece attached to the handle bar, the inner end cap piece extending along the radial direction from the handle bar; an outer end cap piece provided around the inner end cap piece, the outer end cap piece being rotatable about the handle bar along the circumferential direction; and a set screw provided through the outer end cap piece and the inner end cap piece and radially spaced apart from the handle bar to adjust an angle of the outer member with respect to the inner member.

20 Claims, 4 Drawing Sheets

(56) References Cited

U.S. PATENT DOCUMENTS

| | | | | |
|---|---|---|---|---|
| 2020/0217515 | A1* | 7/2020 | Wantland | F24C 15/024 |
| 2022/0381503 | A1* | 12/2022 | Allgeier | F25D 23/028 |

FOREIGN PATENT DOCUMENTS

| | | | | |
|---|---|---|---|---|
| CN | 104196332 B | | 2/2017 | |
| WO | WO-2013098072 A2 | * | 7/2013 | E05B 1/0015 |

* cited by examiner

MULTI-PIECE ADJUSTABLE END CAP FOR AN APPLIANCE HANDLE ASSEMBLY

FIELD OF THE INVENTION

The present subject matter relates generally to domestic appliances, and more particularly to handle assemblies for domestic appliances.

BACKGROUND OF THE INVENTION

Domestic appliances (e.g., refrigerators, ovens, microwaves, etc.) typically include doors to open and close certain receiving spaces or drawers which can be withdrawn and inserted for easy storage of items. Theses doors (or drawers) include handles attached thereto which can be grasped and pulled by a user to gain access via the door or drawer. The handles include connection points at which the handle is connected to the appliance (e.g., the door or drawer). For instance, multiple connection points may be used to attach the handle to the door, such as two at opposite ends of the handle.

However, certain drawbacks exist with current handle assemblies. For instance, imperfections in the door, the drawer, or the handle itself may lead to poor finish quality, resulting in visible gaps between the handle connection points and the appliance. Moreover, assembly of current handles can be time-consuming while trying to ensure proper fits and acceptable appearance. Accordingly, a handle assembly that obviates one or more of the above-mentioned drawbacks would be beneficial. In particular, a handle assembly including adjustable connection points would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a handle assembly for a domestic appliance is provided. The handle assembly may include a handle bar, the handle bar defining an axial direction, a radial direction, and a circumferential direction; an inner end cap piece attached to the handle bar, the inner end cap piece extending along the radial direction from the handle bar; an outer end cap piece provided around the inner end cap piece, the outer end cap piece being rotatable about the handle bar along the circumferential direction; and a set screw provided through the outer end cap piece and the inner end cap piece and radially spaced apart from the handle bar to adjust an angle of the outer end cap piece with respect to the inner end cap piece.

In another exemplary aspect of the present disclosure, an appliance is provided. The appliance may include a cabinet; a door providing selective access to an interior of the cabinet; and a handle assembly attached to the door. The handle assembly may include a handle bar, the handle bar defining an axial direction, a radial direction, and a circumferential direction; an inner end cap piece attached to the handle bar, the inner end cap piece extending along the radial direction from the handle bar; an outer end cap piece provided around the inner end cap piece, the outer end cap piece being rotatable about the handle bar along the circumferential direction; and a set screw provided through the outer end cap piece and the inner end cap piece and radially spaced apart from the handle bar to adjust an angle of the outer end cap piece with respect to the inner end cap piece.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
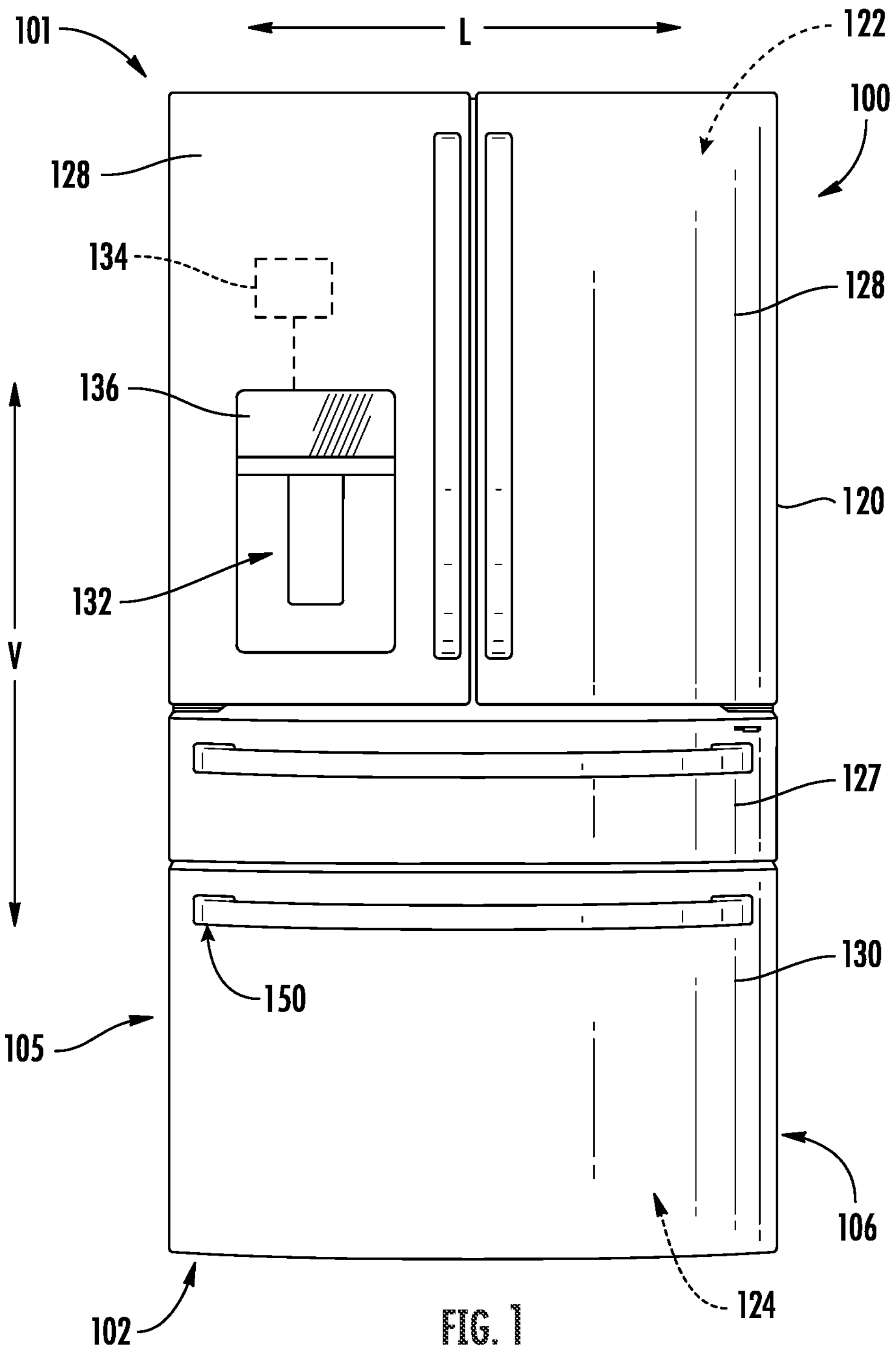
FIG. 1 provides a front view of a refrigerator appliance according to exemplary embodiments of the present disclosure.
Figure 2:
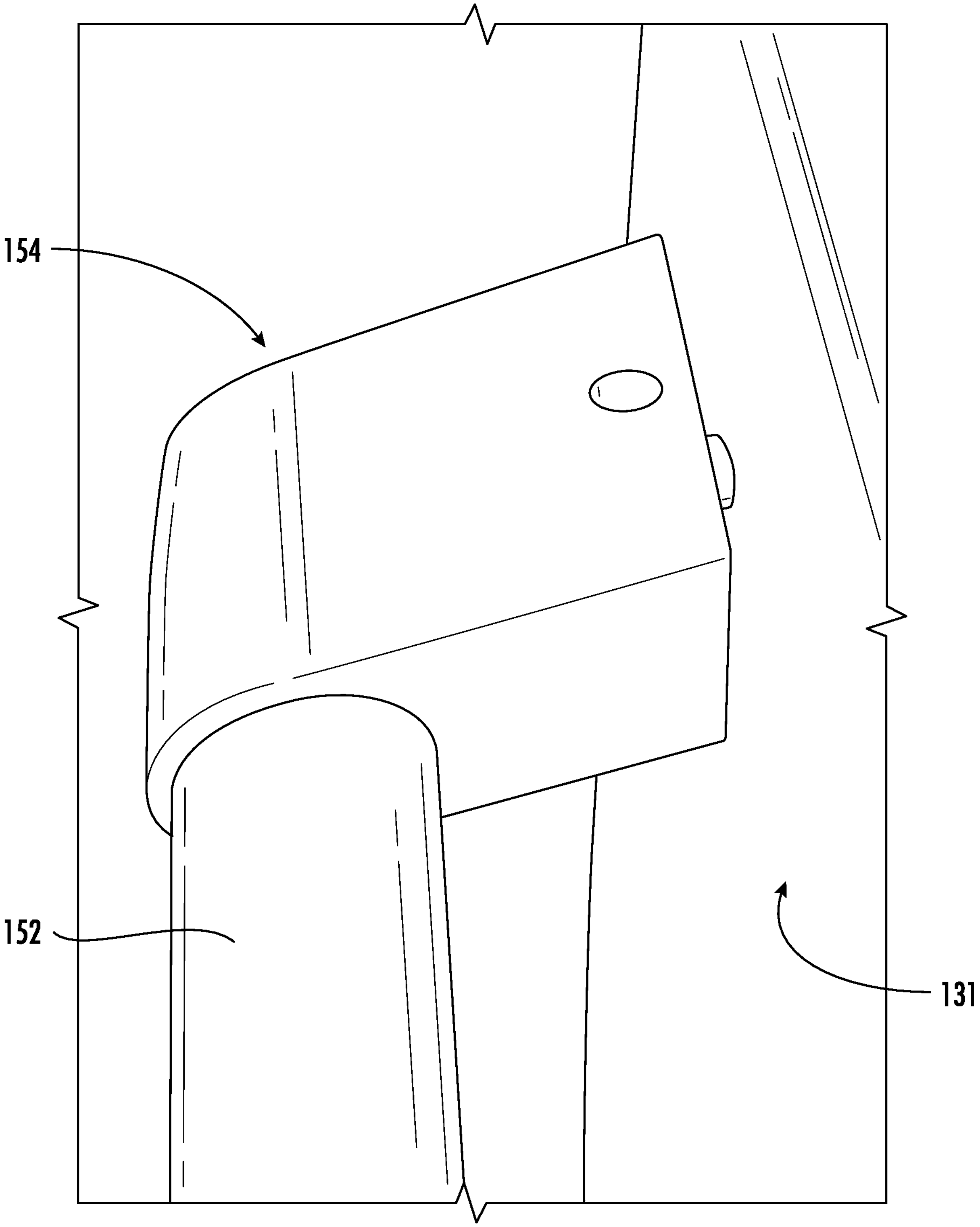
FIG. 2 provides a close-up perspective view of a handle assembly of the exemplary refrigerator appliance of FIG. 1.
Figure 3:
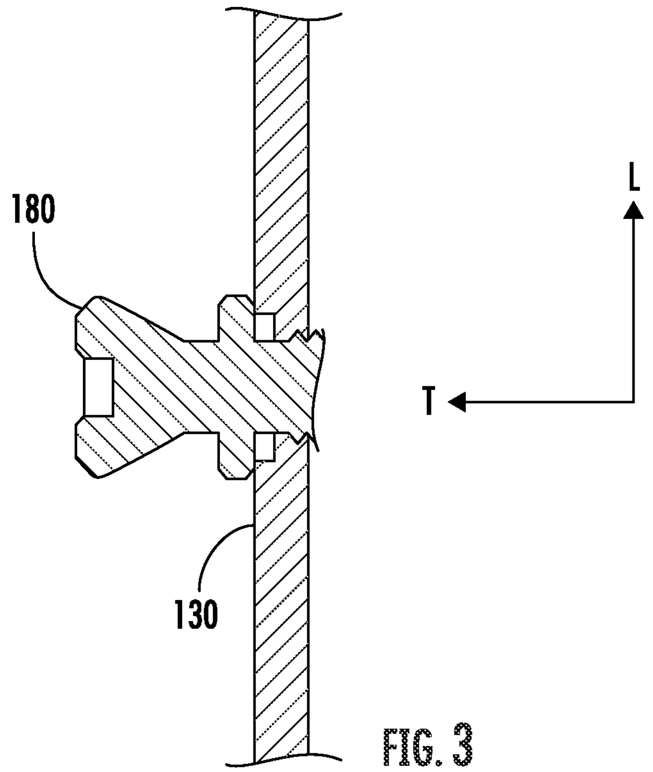
FIG. 3 provides a side section view of an anchor of the exemplary handle assembly of FIG. 2.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 extends between a top 101 and a bottom 102 along a vertical direction V. Refrigerator appliance 100 also extends between a first side 105 and a second side 106 along a lateral direction L. A transverse direction T may additionally be defined perpendicular to the vertical and lateral directions V, L. Refrigerator appliance 100 extends along the transverse direction T between a front portion and a back portion.

Refrigerator appliance 100 may include a cabinet or housing 120 defining an upper fresh food chamber 122 and a lower freezer chamber or frozen food storage chamber 124 arranged below the fresh food chamber 122 along the vertical direction V. An auxiliary food storage chamber may be positioned between the fresh food storage chamber 122 and the frozen food storage chamber 124, e.g., along the vertical direction V. Because the frozen food storage chamber 124 is positioned below the fresh food storage chamber 122, refrigerator appliance 100 may be generally referred to as a bottom mount refrigerator. In the exemplary embodiment, housing 120 may also define a mechanical compartment (not shown) for receipt of a sealed cooling system (not shown). Using the teachings disclosed herein, one of skill in the art will understand that the present technology can be used with other types of refrigerators (e.g., side-by-side) or a freezer appliance as well. Additionally or alternatively, the present technology may be used with other types of appliances (e.g., home appliances) that have door handles. Consequently, the description set forth herein is for illustrative purposes only and is not intended to limit the technology in any aspect.

Refrigerator doors 128 may each be rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present disclosure. A freezer door 130 may be arranged below refrigerator doors 128 for accessing freezer chamber 124. In the exemplary embodiment, freezer door 130 is coupled to a freezer drawer (not shown) slidably mounted within freezer chamber 124. An auxiliary door 127 may be coupled to an auxiliary drawer which may be slidably mounted within the auxiliary chamber.

Operation of the refrigerator appliance 100 can be regulated by a controller 134 that is operatively coupled to a user interface panel 136. User interface panel 136 may provide selections for user manipulation of the operation of refrigerator appliance 100 to modify environmental conditions therein, such as temperature selections, etc. In some embodiments, user interface panel 136 may be proximate a dispenser assembly 132. In response to user manipulation of the user interface panel 136, the controller 134 may operate various components of the refrigerator appliance 100. Operation of the refrigerator appliance 100 may be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated embodiment, the controller 134 is located within the door 128. In such an embodiment, input/output ("I/O") signals may be routed between the controller and various operational components of refrigerator appliance 100. In one embodiment, the user interface panel 136 represents a general purpose I/O ("GPIO") device or functional block. In one embodiment, the user interface 136 includes input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

Refrigerator appliance 100 may include one or more handle assemblies (or handles) 150. For instance, a first handle 150 may be attached to freezer door 130, a second handle 150 may be attached to auxiliary door 127, and third and fourth handles 150 may be attached to refrigerator doors 128. Hereinafter, a single handle 150 will be described in detail. It should be understood that the description for handle 150 may apply to one or more handles used to open or close and of the doors or drawers on a domestic appliance (e.g., refrigerator appliance 100). For instance, with respect to freezer door 130, handle 150 may be removably attached to a front surface 131 of freezer door 130. Handle 150 may be selectively coupled to one or more mounting posts or anchors 180 protruding from freezer door 130, as will be described in more detail below.

Turning generally to FIGS. 2 through 6, handle assembly 150 may include a handle bar 152. Handle bar 152 may be a relatively long and slender tube extending predominantly along a bar axis (e.g., parallel to the lateral direction L). Handle bar 152 may be spaced apart from freezer door 130 such that a user may grasp handle bar 152 to pull open freezer door 130. According to some embodiments, handle bar 152 is cylindrical. For instance, handle bar 152 may define an axial direction A, a radial direction R, and a circumferential direction C. According to this example, axial direction A is coaxial with the bar axis (e.g., predominantly parallel to the lateral direction L). Handle bar 152 may be curved (i.e., the axial direction A may form an arc in front of freezer door 130). Additionally or alternatively, handle bar 152 may be a hollow tube.

Handle assembly 150 may include one or more (e.g., a pair of) end caps 154 connected with handle bar 152 (e.g., at opposite ends relative to the axial direction A). End caps 154 may selectively couple handle assembly 150 to, for example, freezer door 130 (or any suitable door). For instance, end caps 154 may extend from handle bar 152 along the radial direction R toward freezer door 130. Each end cap 154 may selectively surround a respective anchor 180, described below. End caps 154 may thus be tightened or loosened with respect to anchor 180. End cap 154 may include a plurality of end cap pieces. For instance, two or more end cap pieces may be nested within each other to allow a connection between handle bar 152 and freezer door 130 (e.g., anchor 180).

End cap 154 may include an inner end cap piece 156. Inner end cap piece 156 may facilitate a connection between handle bar 152 and freezer door 130. For instance, inner end cap piece 156 may define a first end 1561 and a second end 1562. First end 1561 may be provided proximate freezer door 130 (e.g., when handle assembly 150 is attached to freezer door 130). Accordingly, second end 1562 may be provided opposite first end 1561 along the radial direction of handle bar 152 (e.g., proximate handle bar 152). Inner end cap piece 156 may define a reception cavity 158. For example, reception cavity 158 extends from first end 1561 toward second end 1562 (e.g., toward handle bar 152). Reception cavity 158 may be a blind hole defined along the radial direction R (e.g., along or parallel to the transverse direction T of refrigerator appliance 100).

Inner end cap piece 156 may comprise a set screw hole 157 defined through a sidewall thereof. For instance, set screw hole 157 may be defined through inner end cap piece 156 into reception cavity 158. An axis 1571 of set screw hole 157 may be defined between (e.g., non-parallel to) the vertical direction V and the transverse direction T of appliance 100. In detail, the axis 1571 of set screw hole 157 may be provided at an angle with respect to appliance 100 (e.g., with respect to front face 131 of freezer door 130). As shown particularly in FIG. 5, axis 1571 may be inclined such that a top portion of set screw hole 157 (or axis 1571) is located nearer to freezer door 130 than a bottom portion of set screw hole 157 (or axis 1571). For instance, the angle between freezer door 130 (e.g., an outer surface thereof) and axis 1571 may be between about 5 degrees and about 25 degrees. It should be noted, however, that these ranges are given by way of example only, and that the angle between freezer door 130 and axis 1571 may be any suitable angle that is non-parallel to the radial direction R.

Figure 4:
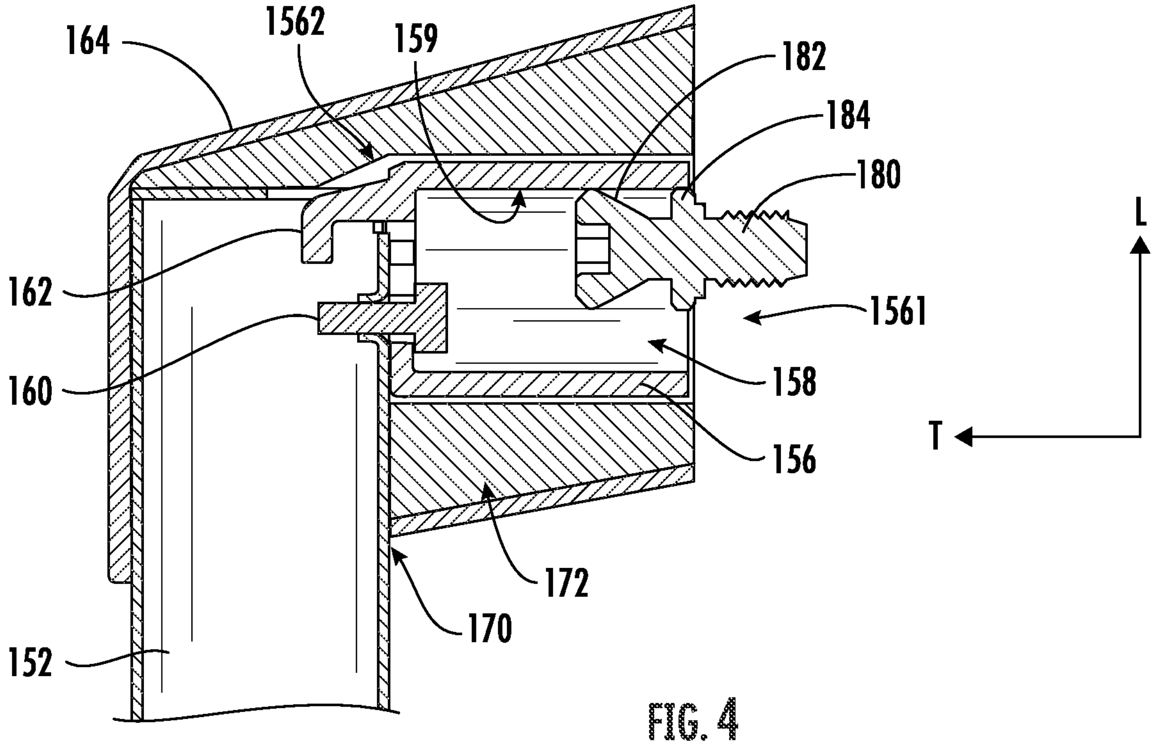
FIG. 4 provides a top section view of the exemplary handle assembly of FIG. 2.
Figure 5:
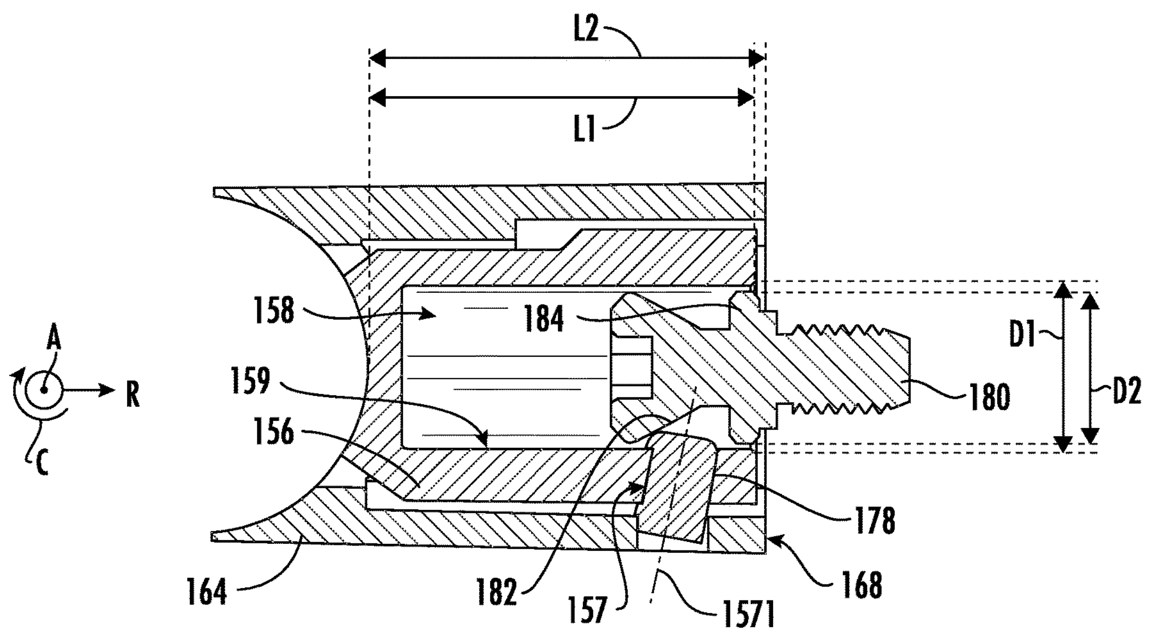
FIG. 5 provides a side section view of an endcap of the exemplary handle assembly of FIG. 2.

Inner end cap piece 156 may be attached to handle bar 152. For instance, inner end cap piece 156 may be coupled to handle bar 152 via a fastener 160 (e.g., a screw, a bolt, a rivet, a snap, etc.). Fastener 160 may penetrate second end 1562 into handle bar 152. For instance, fastener 160 may be provided through second end 1562 within reception cavity 158 (e.g., as shown in FIG. 4). According to some embodiments, inner end cap piece 156 extends radially or rearward along the transverse direction T of refrigerator appliance 100 (e.g., toward freezer door 130). Thus, fastener 160 may penetrate a circumferential surface of handle bar 152 (e.g., extending radially inward into handle bar 152). Accordingly, inner end cap piece 156 may be rigidly connected with or fixed to handle bar 152.

Inner end cap piece 156 may include a hook 162. Hook 162 may extend from second end 1562 of inner end cap piece 156 toward handle bar 152 (e.g., away from reception cavity 158). For instance, hook 162 may extend along the radial direction R into handle bar 152. Hook 162 may thus be parallel (or predominantly parallel) with fastener 160. Additionally or alternatively, hook 162 may be spaced apart from fastener 160 along the axial direction A. Accordingly, inner end cap piece 156 may be fixed to handle bar 152 at a fastening point axially spaced apart from hook 162. Hook 162 may be received within handle bar 152 along the radial direction R and the axial direction A. According to some embodiments, hook 162 penetrates or extends through the circumferential surface of handle bar 152. According to another embodiment, hook 162 penetrates an axial end of handle bar 152. Accordingly, hook 162 may assist fastener 160 in providing location and stability between inner end cap piece 156 and handle bar 152.

As mentioned above, an anchor 180 may be fixed to freezer door 130. Anchor 180 may be a threaded fastener provided in freezer door 130. However, it should be understood that anchor 180 may be attached to freezer door 130 by any suitable means (e.g., a rivet, an adhesive, a snap hook, a bolt, etc.). Anchor 180 may protrude from freezer door 130 (e.g., away from frozen food chamber 124). In detail, anchor 180 may include or define a frustoconical portion 182. Frustoconical portion 182 may be provided at a distal end of anchor 180 (e.g., distal front face 131 of freezer door 130). Frustoconical portion 182 may taper inward toward freezer door 130 (e.g., toward appliance 100). Accordingly, a diameter of anchor 180 may increase from a central portion thereof toward the distal end. A length (e.g., along the radial direction R of handle bar 152 or transverse direction T of appliance 100) of frustoconical portion 182 may vary according to specific embodiments. Additionally or alternatively, a conical angle of frustoconical portion 182 may vary according to specific embodiments.

Anchor 180 may include a flange 184. Flange 184 may be spaced apart from frustoconical portion 182 toward freezer door 130 (e.g., toward appliance 100). According to some embodiments, flange 184 is positioned flush with freezer door 130 (e.g., flush with front face 131 of freezer door 130). A diameter of flange 184 may be predominantly equal to the diameter of frustoconical portion 182 of anchor 180, for instance, at the distal end thereof. Flange 184 may be spaced apart from inner end cap piece 156 (e.g., when handle assembly 150 is attached to freezer door 130). For instance, a diameter D1 of reception cavity 158 of inner end cap piece 156 may be larger than the diameter D2 of flange 184. Thus, a tolerance may be defined between flange 184 and an inner wall 159 of reception cavity 158.

End cap 154 may include an outer end cap piece 164. Outer end cap piece 164 may be provided around inner end cap piece 156. For instance, outer end cap piece 164 may at least partially surround inner end cap piece 156 together with handle bar 152. Outer end cap piece 164 may extend from handle bar 152 along the radial direction R. Outer end cap piece 164 may be provided separately from inner end cap piece 156. In detail, outer end cap piece 164 may be considered as floating with respect to each of inner end cap piece 156 and handle bar 152. Accordingly, a tolerance may be defined between outer end cap piece 164 and each of inner end cap piece 156 and handle bar 152.

Outer end cap piece 164 may include an outer set screw hole 166. Outer set screw hole 166 may be axially aligned with set screw hole 157 of inner end cap piece 156. According to some embodiments, a diameter of outer set screw hole 166 may be larger than a diameter of set screw hole 157. For instance, outer set screw hole 166 may not be threaded to allow movement of outer end cap piece 164 with respect to inner end cap piece 156 and handle bar 152 (e.g., as a set screw 178 (described below) is tightened or loosened).

Outer end cap piece 164 may define a first aperture 170. First aperture 170 may receive at least a portion of handle bar 152 therein. For instance, first aperture 170 may be a blind hole defined in a face of outer end cap piece 164. According to some embodiments, first aperture 170 is defined along the bar axis (e.g., parallel to the lateral direction L with respect to appliance 100). First aperture 170 may be a blind hole defined in outer end cap piece 170. Accordingly, handle bar 152 may be received therein. As mentioned above, a tolerance may be defined between first aperture 170 and handle bar 152.

Outer end cap piece 164 may define a second aperture 172. Second aperture 172 may be spaced apart from first aperture 170. For example, second aperture 172 is defined along the transverse direction T (e.g., with respect to appliance 100). Accordingly, second aperture 172 may be defined along a different direction than first aperture 170. Second aperture 172 may receive inner end cap piece 156 therein. For instance, first aperture 170 may intersect with second aperture 172 at a central portion of outer end cap piece 164. Inner end cap piece 156 may be joined to handle bar 152 (e.g., as described above) at the junction between first aperture 170 and second aperture 172 (e.g., as shown in FIG. 4).

Inner end cap piece 156 may define a first length L1. In detail, first length L1 may be defined between first end 1561 and second end 1562. According to some embodiments, first length L1 is defined from handle bar 152 to a first face (e.g., first end 1561) of inner end cap piece 156. Similarly, outer end cap piece 164 may defined a second length L2. Second length L2 may be defined from handle bar 152 to a face of outer end cap piece 164 (e.g., a first end 168 of outer end cap piece 164). Second length L2 may be greater than first length L1. Accordingly, a distance from handle bar to first end 1561 of inner end cap piece 156 may be shorter than a distance from handle bar 152 to first end 168 of outer end cap piece 164. As will be described, inner end cap piece 156 may thus be able to shift (e.g., about the circumferential direction C of handle bar 152) as set screw 178 is tightened or loosened.

As mentioned above, handle assembly 150 may include a set screw 178. Set screw 178 may be selectively received within outer set screw hole 166 and set screw hole 157. For instance, set screw 178 may be positioned radially spaced apart from handle bar 152. Set screw 178 may contact frustoconical portion 182 of anchor 180 (e.g., along the angle defined between axis 1571 and freezer door 130). As set screw 178 presses against frustoconical portion 182 of anchor 180, outer end cap piece 164 may be adjusted with respect to inner end cap piece 156. For instance, as set screw 178 is tightened, outer end cap piece 164 may rotate about the circumferential direction C of handle bar 152 such that a first edge (e.g., a top edge or a bottom edge) of outer end cap piece 164 (e.g., of first end 168) contacts freezer door 130 (or refrigerator appliance 100). Moreover, set screw 178 may be rotated (e.g., inserted) further (e.g., against frustoconical portion 182 of anchor 180). Inner end cap piece 156 may thus rotate about the circumferential direction C of handle bar 152 with further tightening of set screw 178. Accordingly, a second edge (e.g., the top edge or the bottom edge) of outer end cap piece 164 may also contact freezer door 130. Advantageously, handle assembly 150 may then be tightly fitted to freezer door 130 while maintaining a flush appearance and finish between outer end cap piece 164 and freezer door 130 (or refrigerator appliance 100).

Figure 6:
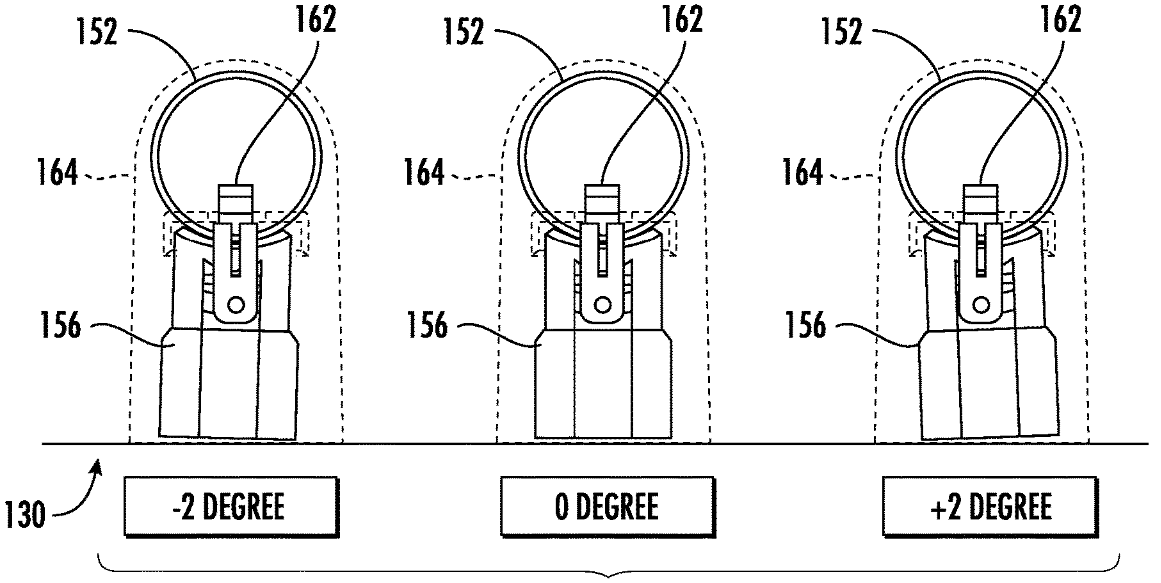
FIG. 6 provides side section views of the exemplary endcap of FIG. 5 at different tilt angles.

For instance, as shown in FIG. 6, inner end cap piece 156 may be provided at various angles with respect to freezer door 130 (e.g., according to irregularities in handle bar 152, freezer door 130, or the like). As seen in each example of FIG. 6, outer end cap piece 164 is flush with freezer door 130 regardless of a tilt angle of inner end cap piece 156 (e.g., with respect to freezer door 130). Advantageously, a gapless finish may be provided across each handle assembly 150 while accounting for or accommodating imperfections of one or more pieces involved. By having a two independent piece end cap, relative movement may be allowed to correct any imperfections simply by tightening set screw 178.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A handle assembly for a domestic appliance, the handle assembly comprising:
- a handle bar, the handle bar defining an axial direction, a radial direction, and a circumferential direction;
- an inner end cap piece attached to the handle bar, the inner end cap piece extending along the radial direction from the handle bar;
- an outer end cap piece provided around the inner end cap piece, the outer end cap piece being rotatable about the handle bar along the circumferential direction, wherein the outer end cap piece is floating with respect to the inner end cap piece and the handle bar; and
- a set screw provided through the outer end cap piece and the inner end cap piece and radially spaced apart from the handle bar to adjust an angle of the outer end cap piece with respect to the inner end cap piece.

2. The handle assembly of claim 1, wherein the inner end cap piece defines a reception cavity extending toward the handle bar from a first end of the inner cap piece, the first end being distal the handle bar.

3. The handle assembly of claim 2, wherein the outer end cap piece defines:

a first aperture receiving a portion of the handle bar therein;

a second aperture spaced apart from the first aperture, the second aperture receiving the inner end cap piece therein.

4. The handle assembly of claim 2, further comprising:

an anchor fastened to the domestic appliance, the anchor being selectively received within the reception cavity of the inner end cap piece, the anchor defining a frustoconical portion tapered inward toward the domestic appliance.

5. The handle assembly of claim 4, wherein the set screw selectively contacts the frustoconical portion of the anchor to secure the inner end cap piece to the anchor.

6. The handle assembly of claim 5, wherein the anchor comprises a flange spaced apart from the frustoconical portion toward the domestic appliance, wherein the flange is spaced apart from a wall of the reception cavity of the inner end cap piece.

7. The handle assembly of claim 5, wherein an axis of the set screw is provided at an acute angle with respect to the domestic appliance.

8. The handle assembly of claim 1, wherein the inner end cap piece comprises a hook, the hook being received within the handle bar along the radial direction and the axial direction.

9. The handle assembly of claim 8, wherein the inner end cap piece is fixed to the handle bar at a fastening point axially spaced apart from the hook.

10. The handle assembly of claim 1, wherein a distance from the handle bar to a face of the inner end cap piece proximate the domestic appliance is less than a distance from the handle bar to a face of the outer end cap piece proximate the domestic appliance.

11. An appliance, comprising:

a cabinet;

a door providing selective access to an interior of the cabinet; and a handle assembly attached to the door, the handle assembly comprising:

a handle bar, the handle bar defining an axial direction, a radial direction, and a circumferential direction;

an inner end cap piece attached to the handle bar, the inner end cap piece extending along the radial direction from the handle bar;

an outer end cap piece provided around the inner end cap piece, the outer end cap piece being rotatable about the handle bar along the circumferential direction, wherein the outer end cap piece is floating with respect to the inner end cap piece and the handle bar; and a set screw provided through the outer end cap piece and the inner end cap piece and radially spaced apart from the handle bar to adjust an angle of the outer end cap piece with respect to the inner end cap piece.

12. The appliance of claim 11, wherein the inner end cap piece defines a reception cavity extending toward the handle bar from a first end of the inner cap piece, the first end being distal the handle bar.

13. The appliance of claim 12, wherein the outer end cap piece defines:

a first aperture receiving a portion of the handle bar therein; and a second aperture spaced apart from the first aperture, the second aperture receiving the inner end cap piece therein.

14. The appliance of claim 12, further comprising:

an anchor fastened to the door of the appliance, the anchor being selectively received within the reception cavity of the inner end cap piece, the anchor defining a frustoconical portion tapered inward toward the door.

15. The appliance of claim 14, wherein the set screw selectively contacts the frustoconical portion of the anchor to secure the inner end cap piece to the anchor.

16. The appliance of claim 15, wherein the anchor comprises a flange spaced apart from the frustoconical portion toward the door, wherein the flange is spaced apart from a wall of the reception cavity of the inner end cap piece.

17. The appliance of claim 15, wherein an axis of the set screw is provided at an acute angle with respect to the door.

18. The appliance of claim 11, wherein the inner end cap piece comprises a hook, the hook being received within the handle bar along the radial direction and the axial direction.

19. The appliance of claim 18, wherein the inner end cap piece is fixed to the handle bar at a fastening point axially spaced apart from the hook.

20. The appliance of claim 11, wherein a distance from the handle bar to a face of the inner end cap piece proximate the door is less than a distance from the handle bar to a face of the outer end cap piece proximate the door.

* * * * *